United States Patent [19]
Ficklinger et al.

[11] 3,849,074
[45] Nov. 19, 1974

[54] APPARATUS FOR MIXING QUICKLY REACTIVE MATERIALS

[75] Inventors: Thomas Franklin Ficklinger, Landenberg, Pa.; Watt Nixon Jeter, Waynesboro, Va.; Kewal Krishan Likhyani, Wilmington, Del.

[73] Assignee: E. I. du Pont de Nemours and Company, Wilmington, Del.

[22] Filed: Dec. 7, 1972

[21] Appl. No.: 312,956

[52] U.S. Cl. ............... 23/285, 23/252 R, 134/8, 134/23, 259/4, 260/78 R, 260/695
[51] Int. Cl. ........ B01j 1/00, B08b 9/02, C08g 20/00
[58] Field of Search ........... 23/285, 252 R, 288 E; 134/8, 23; 259/4; 15/104.02, 104.05, 104.16; 260/695

[56] References Cited
UNITED STATES PATENTS

| | | | |
|---|---|---|---|
| 2,995,451 | 8/1961 | Leach | 134/8 UX |
| 3,031,271 | 4/1962 | Weinbremer | 23/252 R |
| 3,056,661 | 10/1962 | Breer et al. | 23/252 R X |
| 3,111,389 | 11/1963 | Hansen et al. | 23/252 R |
| 3,353,918 | 11/1967 | Perrin | 23/252 R |
| 3,401,195 | 9/1968 | Crampton et al. | 23/252 R X |
| 3,638,275 | 2/1972 | Larson et al. | 134/23 X |
| 3,750,911 | 8/1973 | Ebner et al. | 23/252 R X |

*Primary Examiner*—Joseph Scovronek

[57] ABSTRACT

A novel apparatus is provided for mixing quickly reactive components in a chamber and rapidly discharging the reaction mixture from the chamber while avoiding build up of material along the walls of the chamber or at the inlet orifices. A process for mixing rapidly reacting streams of precursors for the preparation of condensation polymers is described.

1 Claim, 4 Drawing Figures

3,849,074

APPARATUS FOR MIXING QUICKLY REACTIVE MATERIALS

This invention relates to an apparatus useful for the production of condensation polymers.

BACKGROUND OF THE INVENTION

The preparation of wholly aromatic polyamides by the reaction of a diamine and a diacid halide in the presence of certain solvents for the reactants at temperatures below 100°C. is taught in U.S. Pat. No. 3,063,966 to Kwolek et al. Such polymerizations are extremely rapid. Some systems, e.g., p-phenylene diamine and terephthaloyl chloride in a solvent such as hexamethylphosphoramide, at useful concentrations change from a clear liquid to a stiff gel in from about 15 to 30 seconds. The gel can be broken into a crumblike product.

It has been found that this solid, crumblike material has unusual rheological properties, with flow behavior similar to Bingham-type plastics. When a shearing stress exceeding the yield stress is applied, the solid begins to flow and otherwise behaves as a fluid. The yield stress is related to polymer molecular weight and decreases with decreasing molecular weight. If the shearing stress is removed from the polymerization mixture, resolidification is almost instantaneous (less than one second), and all mixing stops and further molecular weight increase becomes negligible.

Unstirred or stagnant areas of the reaction mixture will solidify to a tough gel that adheres to the surface of the reactor.

The rapid increase in viscosity makes it difficult to run such polymerizations in a continuous manner to produce high molecular weight polymer. Inadequate initial mixing of the reactants leads to an inbalance in stoichiometry that is difficult to correct as the viscosity increases. The result is low molecular weight polymer. Inadequate removal of the adiabatic heat of reaction causes the temperature to rise excessively and yields low molecular weight polymer. Lastly, since the polymerization is not yet complete at the gel stage, inadequate mixing at this stage yields a lower molecular weight polymer.

An object of the present invention is to provide improvements which will substantially avoid the difficulties enumerated above and facilitate the production of high molecular weight polymer at commercial throughput rates.

SUMMARY OF THE INVENTION

In one embodiment of the present invention the novel mixing apparatus for quickly reactive components comprises walls defining an elongated mixing chamber of uniform cross-section along its length, discharge means at one end of said chamber, oppositely disposed jetting orifices in the walls of said chamber to allow streams of fluid components to enter the chamber and collide near the middle of the chamber and movable means blocking the flow of the fluid components to the end of the chamber opposite the discharge end comprising a plunger adapted to wipe the walls of the mixing chamber as it moves in the direction of the discharge means while permitting substantially continuous flow of the fluid components into the chamber.

In another embodiment of the present invention the plunger referred to above is hollow and is slotted on opposite sides for alignment with the jetting orifices of the chamber and wiper means positioned within said hollow plunger and wiper means positioned within the slots of the plunger, the wiper means adapted to remain stationary with respect to the chamber walls while the plunger is in motion.

The novel apparatus may be used in a continuous process that involves impinging a liquid stream comprising a 5 to 10 percent by weight solution of p-phenylene diamine in hexamethylphosphoramide against a stream of molten terephthaloyl chloride in a mixing zone, the streams being introduced continuously and at such rate as to provide a liquid reaction mixture from substantially stoichiometric amounts of the diamine and acid halide, substantially completely removing the liquid reaction mixture from the mixing zone within one second after introduction of the streams into said zone and introducing the liquid reaction mixture into a first polymerization zone with vigorous agitation to achieve distribution of the ingredients, cooling the mixture and substantially completely removing the product from the first polymerization zone within about 4 to 15 seconds and forwarding it to a second polymerization zone for mixing the product at a shearing stress sufficient to liquefy any gel that forms at a shear rate of at least 100 sec.$^{-1}$ while cooling the product to a temperature not greater than 95°C. and substantially completely removing the product from the second polymerization zone within 1 to about 15 minutes.

DETAILED DESCRIPTION OF PREFERRED EMBODIMENTS

Figure 1:
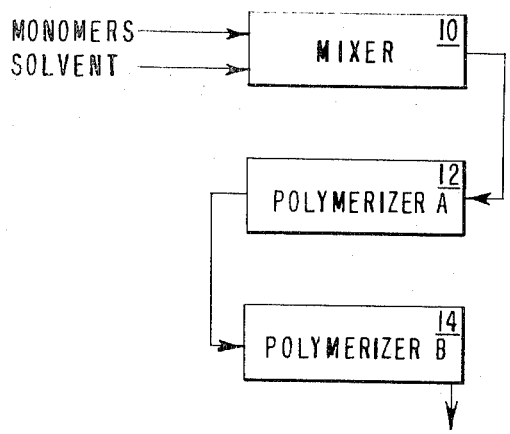
FIG. 1 is a diagrammatic illustration of the process into which the mixing apparatus of the present invention is incorporated.

The various stages of the polymerization process to which the present disclosure is related have been illustrated diagrammatically in FIG. 1. In this process two condensation monomers, at least one of which is in solution while the other is molten or dissolved in a suitable solvent, are introduced into a monomer mixer 10 and rapidly mixed. The mixture is rapidly passed to polymerizer A (12).

Polymerizer 12 provides intense mixing of the polymerization reaction mixture before gelation occurs and cools the mixture.

Polymerizer B (14) provides high shear mixing and cooling of the polymerization reaction mixture until the polymerization is essentially complete. If desired, polymerizers 12 and 14 can be combined into a single apparatus.

Figure 2:
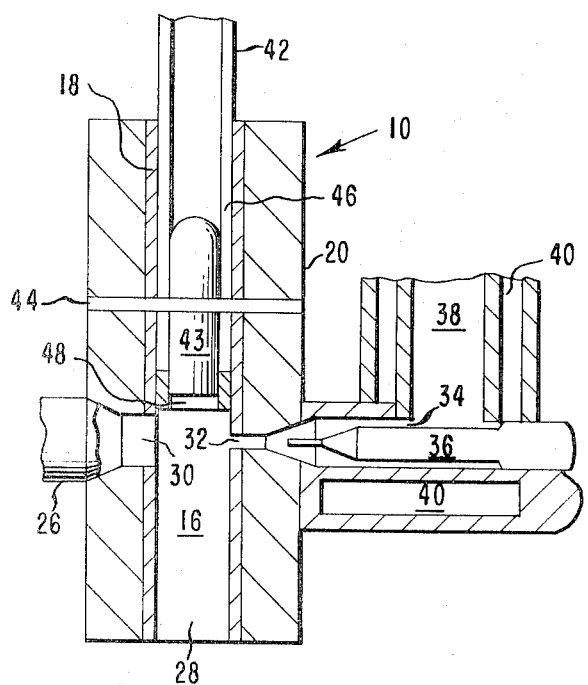
FIG. 2 is a schematic longitudinal sectional view through a preferred embodiment of the mixing apparatus of the invention.

FIG. 2 depicts a preferred embodiment of the mixing apparatus 10 having a movable needle valve 36 to regulate the back pressure of the liquid passing through entrance 38 through space 34 and through orifice 32. Jacketing 40 provides means to heat or cool the liquid. The second liquid enters through entrance 26 through orifice 30. Pin 44 passes through a slot in hollow plunger 42.

Figure 3:
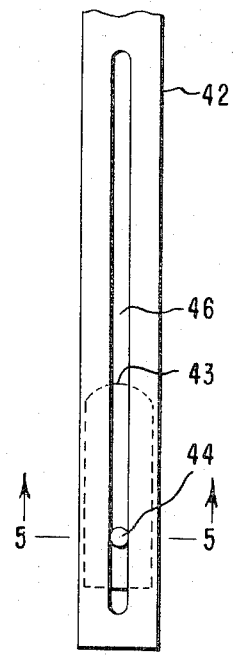
FIG. 3 is a schematic longitudinal view of the plunger used in FIG. 2.
Figure 4:
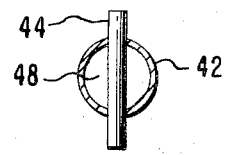
FIG. 4 is a schematic transverse sectional view taken on line 5—5 of FIG. 3.

FIGS. 3 and 4 depict the hollow plunger 42 with slot 46 that slides over fixed pin 44. Replaceable sleeve 18 provides close fit with plunger 42. In operation while the plunger 42 is moving down to exit 28 (see FIG. 2) to ream the walls of the chamber, the two streams of liquid continuously pass through the two slots 46 and drop down the center 48. Wiper 43 is attached to pin 44 and serves to clean polymer and gel from center 48 when plunger 42 is drawn up while pin 44 serves to wipe polymer and gel from the walls of the slot when the plunger is drawn up. Wiper 43 may be a rod fitting snugly within the hollow plunger and located upstream of the fluid inlet orifices.

The cross-section of mixing chamber 16 is preferably round but other sections such as a square, etc., can be used. The sizes of the orifices 30 and 32 are preferably selected to provide a velocity of fluid streams such that in operation the mass velocity (i.e., fluid density X linear velocity) of the two streams are approximately equal so that they impinge in the center of the mixing chamber (midway between the opposing orifices).

Valve control means can be used before each orifice to regulate the pressure drop (and energy release) of the streams into the mixing chamber. Heating or cooling means can be provided for either or both liquids.

The apparatus is preferably used in a vertical position and exit 28 is suitably connected to polymerizer A.

The length of mixing chamber 16 should be about 6 to 12 (preferably 8 to 10) times the diameter of the chamber.

Polymerizers

A suitable polymerizer for both polymerizer A and B is an all surface-wiped continuous mixer such as disclosed in U.S. Pat. Nos. 3,195,868; 3,198,491; 3,216,706; 3,387,826; 3,423,074; 3,575,382 and 3,618,902. Cooling means such as a jacketed body, hollow shafts and/or hollow mixing elements are preferably provided.

Polymerizer A, when used, provides intensive mixing and cooling for the short period of time (e.g., 4 to 15 seconds) before the reaction mixture gels. Polymerizer B provides mixing and cooling after the reaction mixture gels until the polymerization is essentially complete. The apparatus should have sufficient power to overcome the yield stress of the gel.

Process Considerations

The process is discussed below with reference to the polymerization of p-phenylene diamine and terephthaloyl chloride in the presence of hexamethylphosphoramide.

A stream of a solution of about 5 to 10 percent of p-phenylene diamine in hexamethylphosphoramide at a temperature as low as practical for solubility (e.g., about 10° to 30°C.) is intensively mixed with a jet stream of molten (85° to 120°C.) terephthaloyl chloride in stoichiometric proportions. The relatively thin (of the order of 100 centipoise) mixture is then forwarded within one second to a first polymerizer stage where it is intensely mixed with cooling for from 4 to 15 seconds. The partially polymerized product with a viscosity of about 10 to 100 poise and having a temperature of less than about 95°C. is then passed to the second polymerizer stage. In the second stage, the polymerization reaction product is submitted to intensive mixing for from 1 to about 15 minutes characterized by a shear rate of at least 100 sec.$^{-1}$. The product is cooled while being mixed to provide an exit product temperature of about 95°C. or lower. The product is in the form of a dry crumb.

What is claimed is:

1. A novel mixing apparatus for quickly reactive fluid streams comprising walls defining an elongated mixing chamber of uniform cross-section along its length, discharge means at one end of said chamber, oppositely disposed jetting orifices in the walls of said chamber to allow streams of fluid components to enter the chamber and collide near the center of the chamber, a plunger positioned within the chamber and adapted to wipe the walls of the mixing chamber as it moves in the direction of the discharge means while permitting substantially continuous flow of the fluid components into the chamber, said plunger being hollow and slotted on opposite sides for alignment with the jetting orifices of the chamber, and wiper means positioned both within said hollow plunger and its slots, the said wiper means being located upstream of said jetting orifices and adapted to remain stationary with respect to the chamber walls whereby the plunger is wiped as it moves away from the discharge means.

* * * * *

PO-1050
(5/69)

UNITED STATES PATENT OFFICE
CERTIFICATE OF CORRECTION

Patent No. 3,849,074　　　　　　　　　Dated November 19, 1974

Inventor(s) Thomas Franklin Fickinger, Watt Nixon Jeter & Kewal Krishan Likhyani It is certified that error appears in the above-identified patent and that said Letters Patent are hereby corrected as shown below:

Cover page, column 1, line 2, "Ficklinger et al." should read -- Fickinger et al. --.

Cover page, column 1, line 5, "Thomas Franklin Ficklinger" should read -- Thomas Franklin Fickinger --.

Signed and sealed this 8th day of April 1975.

(SEAL)
Attest:

RUTH C. MASON
Attesting Officer

C. MARSHALL DANN
Commissioner of Patents
and Trademarks